(12) United States Patent
Ferguson et al.

(10) Patent No.: US 6,430,595 B1
(45) Date of Patent: Aug. 6, 2002

(54) METHOD AND APPARATUS FOR ESTABLISHING A DATABASE USED FOR CORRELATING INFORMATION GATHERED VIA SNMP

(75) Inventors: Darin Ferguson, Raleigh; Robert Clouston, Cary; Anthony Talerico, Wake Forest, all of NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/315,284

(22) Filed: May 20, 1999

(51) Int. Cl.$^7$ .............................................. G06F 15/16
(52) U.S. Cl. ........................ 709/200; 709/223; 709/224; 709/227
(58) Field of Search ................................ 709/227, 200, 709/228, 236, 223, 224, 238, 249, 220, 240; 370/389; 395/200.57, 200.58; 710/11, 15, 14, 16

(56) References Cited

U.S. PATENT DOCUMENTS

| | | | |
|---|---|---|---|
| 4,644,532 A | 2/1987 | George et al. ................ 370/94 |
| 4,827,411 A | 5/1989 | Arrowood et al. ........... 364/300 |
| 4,864,559 A | 9/1989 | Perlman ....................... 370/60 |
| 4,893,307 A | 1/1990 | McKay et al. .............. 370/94.1 |
| 5,021,949 A | 6/1991 | Morten et al. .............. 364/200 |
| 5,027,350 A | 6/1991 | Marshall ................... 370/85.13 |
| 5,142,622 A | 8/1992 | Owens ........................ 395/200 |
| 5,361,256 A | 11/1994 | Doeringer et al. ............ 370/60 |
| 5,371,852 A | 12/1994 | Attanasio et al. ............ 395/200 |
| 5,394,402 A | 2/1995 | Ross ......................... 370/94.1 |
| 5,473,608 A | 12/1995 | Gagne et al. ............. 370/85.13 |
| 5,491,796 A | 2/1996 | Wanderer et al. ...... 395/200.09 |
| 5,511,168 A | 4/1996 | Perlman et al. ........ 395/200.15 |
| 5,517,622 A | 5/1996 | Ivanoff et al. .......... 395/200.13 |
| 5,612,959 A | 3/1997 | Takase et al. ................ 370/390 |
| 5,617,421 A | 4/1997 | Chin et al. ................... 370/402 |
| 5,675,740 A | 10/1997 | Heimsoth et al. ...... 395/200.12 |
| 5,678,006 A | 10/1997 | Valizadeth et al. .... 395/200.02 |
| 5,684,800 A | 11/1997 | Dobbins et al. ............. 370/401 |
| 5,684,988 A | 11/1997 | Pitchaikani et al. ........ 395/615 |
| 5,694,595 A | 12/1997 | Jacobs et al. ............... 395/609 |
| 5,740,171 A | 4/1998 | Mazzola et al. ............ 370/392 |
| 5,742,604 A | 4/1998 | Edsall et al. ................ 370/401 |
| 5,752,003 A | 5/1998 | Hart ........................... 395/500 |

(List continued on next page.)

OTHER PUBLICATIONS

World Wide Web page http://www.cisco.com/univercd/cc/td/doc/cisintwk/ito_doc/dlsw.html, *Data–Link Switching (DLSw)*, Feb. 23, 1999, pp. 1–8.

World Wide Web page http://www.cisco.com/warp/public/558/16.html, *Cisco Catalyst Workgroup Switch Version 3.0*, Jul. 15, 1998, pp. 1–5.

(List continued on next page.)

Primary Examiner—Ayaz Sheikh
Assistant Examiner—Oanh L Duong
(74) Attorney, Agent, or Firm—Cesari and McKenna, LLP

(57) ABSTRACT

A technique efficiently creates a database used to correlate information identifying data session traffic exchanged between entities of a computer network with information relating to multi-protocol intermediate devices configured to carry the session traffic throughout the network. The intermediate devices are preferably routers configured to carry System Network Architecture (SNA) session traffic between SNA entities comprising a host network connection and a physical unit (PU) station. The host network connection utilizes a channel-attached router for connectivity with a host computer. The technique allows a network management station (NMS) program to establish a NMS database by obtaining a PU name associated with an active SNA session without requiring a presence on or continual communication with a virtual telecommunication access method on the host.

42 Claims, 5 Drawing Sheets

U.S. PATENT DOCUMENTS

| | | | |
|---|---|---|---|
| 5,764,636 A | | 6/1998 | Edsall ........................ 370/401 |
| 5,796,732 A | | 8/1998 | Mazzola et al. ............ 370/362 |
| 5,802,053 A | | 9/1998 | Bollella et al. ............. 370/401 |
| 5,802,313 A | | 9/1998 | Mitchell et al. ........ 395/200.68 |
| 5,835,728 A | | 11/1998 | Shinomiya et al. .... 395/200.72 |
| 5,845,081 A | | 12/1998 | Rangarajan et al. ... 395/200.54 |
| 5,909,550 A | * | 6/1999 | Shankar et al. ........ 395/200.57 |
| 5,983,272 A | * | 11/1999 | Rosen et al. ................. 709/227 |
| 6,115,751 A | * | 9/2000 | Tam et al. ................... 709/240 |
| 6,131,117 A | * | 10/2000 | Clark et al. ................. 709/223 |
| 6,173,321 B1 | * | 1/2001 | Peterson et al. ............ 709/220 |

OTHER PUBLICATIONS

World Wide Web page http://www.cisco.com/warp/public/539/7.html, *Cisco VLAN Roadmap,* Jul. 15, 1998, pp. 1–9.

Draft Standard for Virtual Bridged Local Area Networks, P802.1Q/D6, May 16, 1997, pp. 1–10, 70–72.

IAC Newsletter Database, *Cisco Announces New Fast Ethernet Interface,* Apr. 15, 1995, pp. 2–3.

IAC Newsletter Database, *Cisco Announces Token–Ring Switching Products,* Apr. 15, 1995, pp. 4–5.

Wells, et al., DLSw Standardwk, *Data Link Switching: Switch–to–Switch Protocol,* Apr. 1995, pp. 1–91.

World Wide Web page http://www.cisco.dk/warp/public/100/44.html, *SNA Internetworking,* posted May 10, 1999, pp. 1–5.

World Wide Web page http://www.cisco.com/warp/public/558/61.html, *Cisco Channel Interface Processor,* May 10, 1999, pp. 1–10.

World Wide Web page http://www.cisco.com/warp/public/614/2.html. *DLSw and DLSw+,* Sep. 28, 1999, pp. 1–8.

* cited by examiner

METHOD AND APPARATUS FOR ESTABLISHING A DATABASE USED FOR CORRELATING INFORMATION GATHERED VIA SNMP

CROSS-REFERENCE TO RELATED APPLICATIONS

The present invention is related to the following copending and commonly assigned U.S. Patent Applications:

U.S. patent application Ser. No. 08/999,271 titled, Technique for Correlating Logical Names with IP Addresses on Internetworking Platforms, by Wayne Clark et al., filed on Dec. 29, 1997;

U.S. patent application Ser. No. 08/315,550 titled, Method and Apparatus for SNA/IP Correlation with Multiple DLSw Peer Connections, by Darin Ferguson et al., filed herewith;

U.S. patent application Ser. No. 09/315,551 titled, Method and Apparatus for SNA/IP Correlation in a Mixed APPN and DLSw Network, by Darin Ferguson et al., filed herewith;

U.S. patent application Ser. No. 09/315,441 titled, Method and Apparatus for Determining SNA Sessions Using Various Protocols for Transport Based on Filter Criteria, by Darin Ferguson et al., filed herewith; and U.S. patent application Ser. No. (112025-0148) titled, Method and Apparatus for Determining a Path for a Session Using Various Protocols for Transport, by Darin Ferguson et al., filed herewith, each application of which is hereby incorporated by reference as though fully set forth herein.

FIELD OF THE INVENTION

The present invention relates to computer networks and, more particularly, to establishment of a database for managing entities in a computer network.

BACKGROUND OF THE INVENTION

Data communications in a computer network involves the exchange of data between two or more entities interconnected by communication links and subnetworks. These networks are typically software programs executing on hardware computer platforms which, depending on their roles within a network, may serve as host stations, end stations or intermediate stations. Examples of intermediate stations include routers, bridges and switches that interconnect communication links in subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on that data as it passed through each layer, and the layers communicate with each other by means of the predefined protocols. This design permits each layer to offer selected services to other layers using a standardized interface that shields the other layers from details of actual implementation of the services. The lower layers of these architectures are generally standardized and implemented in hardware and firmware, whereas the higher layers are usually implemented in the form of software. Examples of such communications architectures include the System Network Architecture (SNA) developed by International Business Machines (IBM) Corporation and the Internet Communications Architecture.

The Internet architecture is represented by four layers termed, in ascending interfacing order, the network interface, internetwork, transport and application layers. The primary internetwork layer protocol of the Internet architecture is the Internet Protocol (IP). IP is primarily a connectionless protocol that provides for internetworking routing, fragmentation and reassembly of exchanged packets—generally referred to as "datagrams" in an Internet environment—and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture; the TCP/IP architecture is discussed in *Computer Networks*, 3rd edition, by Andrew S. Tanenbaum, published by Prentice-Hall, PTR in 1996, all disclosures of which are incorporated herein by reference, particularly at pages 28–54.

SNA is a communications framework widely used to define network functions and establish standards for enabling different models of IBM computers to exchange and process data. SNA is essentially a design philosophy that separates network communications into several layers termed, in ascending order, the physical control, the data link control, the path control, the transmission control, the data flow control, the presentation services and the transaction services layers. Each of these layers represents a graduated level of function moving upward from physical connections to application software.

In the SNA architecture, the data link control layer is responsible for transmission of data from one end station to another. Bridges or devices in the data link control layer that are used to connect two or more LANs so that end stations on either LAN are allowed to access resources on the LANs. Connection-oriented services at the data link layer generally involve three distinct phases: connection establishment, data transfer and connection termination. During connection establishment, a single path or connection, e.g., an IEEE 802.2 logical link control type 2 (LLC2) connection, is established between the source and destination stations. Once the connection has been established, data is transferred sequentially over the path and, when the LLC2 connection is no longer needed, the path is terminated. Reliable communication of the LLC2 is well known and described by Andrew Tanenbaum in his book Computer Networks, Second Edition, published in 1988, all disclosures of which are incorporated herein by reference, especially at pages 253–257.

FIG. 1 is a schematic block diagram of a conventional computer network 100 having a host computer coupled to a Token Ring (TR) network TR1 and an end station coupled to TR2. The TR networks are of the type that support Source/Route Bridging (SRB) operations with respect to the contents of a routing information field (RIF) of a frame. The host computer is preferably a SNA host entity comprising a host mainframe computer (host) 110 coupled to a channel-attached router or front end processor (FEP), hereinafter referred to as the "host network connection" 112; in addition, the end station is a "physical unit" (PU) SNA entity 114. An SRB bridging device B1 interconnects TR1 and TR2 such that the SRB network 100 effectively functions as a LAN.

The PU communicates with the host by exchanging TR frames over LLC2 connections or sessions through the SRB network. Each TR frame 120 includes a RIF 122 that contains source route information in the form of ring number/bridge number pair "hops" within a path between the stations. For example, the RIF 122 of TR frame 120 transmitted by the PU to host contains [0021.0010]. An LLC2 session is established between the stations using a special TR frame, called an explorer frame.

The explorer frame is used by a source (PU) to "discover" the path to a destination (host); thereafter, a Set Asynchronous Balanced Mode Extended (SABME) frame is sent from the PU to the host to establish a logical connection between the end stations, and the host responds to the SABME frame with an Unnumbered Acknowledgment (UA) frame. Once the UA frame is received by the PU, a connection is established between the source and destination, and these stations communicate by exchanging TR information (INFO) and acknowledgment frames until the logical link SNA session is completed.

For example, the PU transmits an INFO frame over TR2 and through BR1 and TR1 to the host. Upon successfully receiving the INFO frame, the host responds by transmitting an LLC2 Receive/Ready (RR) acknowledgment frame over the SRB network to the PU. This INFO/RR exchange continues until the PU has successfully transmitted all of its data and the host has successfully received all of that data. Session completion is then initiated by a Disconnected Mode (DM) frame being transmitted from the PU to the host; the disconnection is thereafter acknowledged by the host responding with a UA frame. The LLC2 frames (packets) are described by Radia Perlman in her book Interconnections, Bridges and Routers, published by Addison Wellesly Publishing Company, in 1992, all disclosures in which are incorporated herein by reference, particularly at pages 33–34.

As noted, each TR INFO frame sent from a source to a destination is acknowledged by an RR frame; if the source end station does not receive the acknowledgment frame within a prescribed period of time, a "time-out" may occur and the source sends a DM frame to prematurely terminate the session. Since network 100 is a LAN, it facilitates fast transfer of information between its connected stations and, as a result, a time-out condition should rarely occur. If a WAN such as a TCP/IP cloud is disposed within a LAN-based network, it is likely that a time-out will arise because of the latencies introduced by the TCP/IP cloud. That is, a frame traversing the WAN cloud incurs substantial delay as opposed to the LAN because the WAN is generally not as fast as the LAN.

Data Link Switching (DLSw) is a mechanism for forwarding SNA protocol frames over, e.g., a TCP/IP backbone WAN such as the Internet. In traditional bridging, the data link connection is end-to-end, i.e., effectively continuous between communicating end stations. A stream of data frames originating from a source station on a source LAN traverses one or more bridges specified in the path over the LLC2 connection to a destination station on a destination LAN. In a network implementing DLSw, by contrast, the LLC2 connection terminates at a local DLSw device entity, e.g., a router. An example of a DLSw network arrangement may comprise a host DLSw router connected to a host computer via a host LAN and a remote DLSw router connected to a remote LAN having a destination station. The LANs that are accessed through the DLSw routers may appear as SRB subnetworks attached to adjacent rings; each of these adjacent rings manifest as a virtual ring within each DLSw router that effectively terminates the SRB network.

FIG. 2 is a schematic block diagram of such a DLSw network 200 having a TCP/IP cloud 205 disposed between host and remote SRB subnetworks 202, 204. When communicating with the host as described above, the PU sends an INFO frame to which host responds with a RR frame. Because of the latencies introduced by the WAN cloud, however, a time-out condition may occur during this exchange. The DLSw network includes host and remote DLSw routers 1,2 that border the WAN cloud. These DLSw routers function as end points between TCP sessions over the TCP/IP cloud when transporting TR frames associated with LLC2 sessions over that intermediate network. DLSw switching may obviate the time-out problem introduced by the TCP/IP cloud by, e.g., having DLSw1 return a RR acknowledgment frame to the source end station (PU) upon receiving an INFO frame. Notably, the RR frame is returned prior to transmitting the native TR INFO frame over the TCP/IP network.

Broadly stated, each DLSw router establishes a "peer relationship" to the other DLSw router in accordance with a conventional capabilities exchange message sequence, and the logical and physical connections between these routers connect the subnetworks into a larger DLSw network. To establish a peer connection in accordance with an implementation of DLSw switching, the host DLSw router first opens logical TCP (Read/Write) "pipe" connections to the remote DLSw router using a conventional socket technique to create a socket into the transport layer of the protocol stack. Once the TCP pipes are established, a Switch-to-Switch (SSP) Protocol is used to transport the capabilities exchange messages between the two DLSw routers.

The capability exchange messages contain various parameters, such as the number of pipes used for communicating between the DLSw routers and the largest frame size supported by the routers. Each DLSw router responds to each capability exchange message issued by its peer router with a capability exchange response message. Upon completion of the exchange, each router reconfigures itself to "act upon" the agreed capabilities and the peer connection is established. Establishment of a peer connection can occur automatically upon "boot-up" of each DLSw router; that is, as soon as a DLSw router activates, it connects with its DLSw peer. The DLSw forwarding mechanism is well known and described in detail in Wells et al. *Request For Comment* (RFC) 1795 (1995).

Upon receiving a TR frame from a source on the host SRB subnetwork that is destined for a destination on the remote SRB subnetwork, the host DLSw router employs the SSP protocol to communicate with its DLSw peer router by forwarding the native TR frame over the TCP/IP network to the remote SRB subnetwork. That is, the TR frame received at the host DLSw router from the source is encapsulated within a SSP protocol frame and forwarded over the TCP/IP cloud to the remote DLSw router. The source route information contained in the RIF of each TR frame terminates inside the virtual ring of the DLSw router; notably, the RIF information is locally stored at the DLSw router.

The host DLSw router then multiplexes the LLC2 session data stream over a conventional TCP transport connection to a remote DLSw router. LLC2 acknowledgment frames used to acknowledge ordered receipt of the LLC2 data frames are "stripped-out" of the data stream and acted upon by the host DLSw router; in this way, the actual data frames are permitted to traverse the IP cloud to their destination while the "overhead" acknowledgment frames required by the LLC2 connections for reliable data delivery are kept off the cloud. The LLC2 connections from the source LAN to the host transmitting DLSw router, and from the remote receiving DLSw router to the destination LAN, are entirely independent from one another. Data link switching may be further implemented on multi-protocol routers capable of handing DLSw devices as well as conventional (e.g., SRB) frames.

DLSw routers can establish multiple parallel TCP sessions using well-known port numbers. All frames associated with a particular LLC2 connection typically follow a single designated TCP session. Accordingly, SNA data frames originating at the PU 214 are transmitted over a particular LLC2 connection along TR2 to DLSw2, where they are encapsulated within a designated TCP session and transported over the TCP/IP cloud 205. The encapsulated messages are received by DLSw1, decapsulated to their original frames and transmitted over a corresponding LLC2 connection of TR1 to the host 210 in the order received by DLSw2 from the PU.

The LLC2 connection between the PU and host is identified by a data link identifier (ID) 260 consisting of a pair of attachment addresses associated with each end station. Each attachment address is represented by the concatenation of a media access control (MAC) address (6 bytes) and a LLC service access point (SAP) address (1 byte). Specifically, each attachment address is classified as either a target address comprising a destination MAC (DMAC) and a destination SAP (DSAP), or an origin address comprising a source MAC (SMAC) and source SAP (SSAP) addresses. The attachment addresses are contained in the TRs frame exchanged between the PU and host entities.

Furthermore, the designated TCP session is identified by a pair of circuit IDs 270, each comprising a 64-bit number that identifies the LLC2 circuit within a DLSw circuit. The DLSw circuit ID generally comprises a data link circuit port ID (4 bytes) and a data link correlator (4 bytes). A pair of circuit IDs along with a data link ID uniquely identifies a single end-to-end circuit through the network. Notably, each DLSw router maintains a table 250 comprising a plurality of data link ID and corresponding DLSw circuit ID pair entries. In order to associate LLC2 frame traffic with a corresponding DLSw circuit when communicating over the IP cloud, each DLSw router typically indexes into the table (the "DLSw table") using a data link ID to find the corresponding DLSw circuit IDs.

When managing a multi-protocol TCP/IP-based SNA network, such as DLSw network 200, information about the protocols used to transport SNA session traffic is available to a network operator of a network management station (NMS) 280 via a Simple Network Management Protocol (SNMP). For example the DLSw circuit information described above, including the data link IDs, are available to the NMS 280 by accessing DLSw management information base (MIB) tables within the routers using SNMP. The MIB and SNMP protocol, and their use in providing network management information between SNMP management stations and agents are well-known and described in, e.g., SNMP, SNMPv2 and RMON by William Stallings, printed by Addison Wesley Publishing Company, 1996.

The information acquired by SNMP allows a management application executing on the NMS to present a view of TCP/IP devices carrying the SNA traffic. SNMP generally does not provide the PU name for the SNA sessions being carried since this information does not flow in typical SNA sessions. However, the SNA sessions can be identified by their source and destination MAC/SAP addresses. That is, the orientation of the MAC/SAP attachment addresses of the data link IDs acquired from each router is dependent on the proximity of the SNA entity to which the router is connected. For example, the remote DLSw router identifies the PU MAC/SAP attachment address as origin and the host network connection MAC/SAP attachment address as target, whereas the host DLSw router identifies the PU and host connection addresses in reverse order. The DLSw routers do not, however, maintain the name of the PU, which is a common way for an operator to identify a session.

An outage involving a PU session in the network 200 may be diagnosed by the network operator using a conventional approach that correlates SNA frame traffic sessions to DLSw routers for a network having a peer connection over an IP cloud between DLSw peer routers. Typically, management of the SNA entities takes place on the host in accordance with a network management application program, such as NetView®, executing on the host. The application can access the status of the PU entity by virtue of its definition contained in a specialized data structure 290 of the host network connection. This data structure is a virtual telecommunication access method (VTAM) table 290 having entries whose contents define all the PUs with respect to the host. The content definitions of the entries comprise a name (e.g. PU name 292) along with an identifier block number/ identifier number (IDBLK/IDNUM 294) or control point (CP) name that uniquely identifies each PU on a network at a given time.

The NetView application manages those SNA resources known to it; as used in this context, the term "managing" means that the application program can check and change the status of the resources, and can further control those resources to acquire, e.g., information leading to the traffic patterns of the resources. However, the NetView application cannot manage the component in the routers that encapsulate SNA traffic. As noted, the DLSw routers are preferably managed by the SNMP tool executing on the NMS which communicates with SNMP agents resident on the routers.

According to the conventional approach, the NMS communicates with an SNMP agent in each DLSw router to acquire DLSw MIB information including a data link ID identifying a DLSw circuit associated with the router. Since the host computer "owns" SNA sessions in the network, it maintains SNA-specific information (in addition to the PU name) such as the MAC/SAP addresses 296 for the host network connection and the PU on VTAM 290 in the host. A SNA View application 298, along with VTAM exit code 295, are also resident on the host and are used to acquire the MAC/SAP addresses and PU names. The exit code 295 executes in the address space of VTAM, which is a mechanism for handling all network connections to the host. The VTAM exit code is invoked upon the occurrence of an event, such as a PU session connecting to the network. Invocation of the exit code enables the SNA View application 298 to collect the SNA-specific information, including the PU name and MAC/SAP addresses. SNA View also communicates with VTAM to collect static definition information associated with the PU name if the PU is statically defined.

The PU name 292 may also be dynamically generated by the VTAM exit when the PU connects to the network. Typically, the PU name that is generated is determined in accordance with an algorithm that is dependent upon a supplied IDBLK/IDNUM or CP name value. The PU name may consist of a predetermined prefix followed by a character representation of the IDNUM portion of the value. For example if the prefix is "DYN" and the IDBLK/IDNUM is "05D/00001", the generated PU name may be "DYN00001". Although there is no configuration member containing a static definition of the PU name, the dynamically generated name is still provided to the SNA View application 298.

A complementary version of SNA View 288 (i.e., Cisco-Works Blue SNA View) executes on the NMS and communicates with the host application over a logical TCP/IP (or LU 6.2) "pipe" connection 285. The SNA View application 288 on the NMS 280 obtains the SNA-specific information from VTAM 290 over the pipe 285 and stores that information on a database 282 of the NMS. In the case of DLSw network 200, the SNA-specific information retrieved from VTAM does not include information with respect to the DLSw routers that are routing the session traffic. Using the PU name of a session, an SNMP manager 284 on the NMS may then correlate local and remote MAC/SAP addresses to the PU name in accordance with a conventional correlation procedure.

In response to a query from the operator specifying a PU name of the session, the NMS 280 compares the MAC/SAP addresses retrieved from VTAM with the data link IDs in the MIBs to identify a DLSw circuit at each router. The NMS then uses the orientation of the MAC/SAP attachment addresses from the routers to distinguish between the host and remote DLSw routers. Thereafter, the NMS can draw the topology of the DLSw network, including the DLSw circuit and PU session, to isolate any failures in the network.

A problem with the conventional approach described above is that customers generally resist the notion of installing "foreign" VTAM exit code on their host mainframes, particularly in the case of a service provider. This is primarily because of the possibility that VTAM performance may be adversely affected by the exit code. For example, execution of the VTAM exit code 295 on the mainframe may "slow down" the performance of service provider connections between the host and PU because of the processing resources needed to execute that code. Moreover, failure of the exit code may prevent dynamic PUs from attaching to the network, thereby causing end user access failures. Thus, it would be desirable (from a customer's perspective) to remove the VTAM exit code requirement from the host mainframe.

Therefore, an object of the present invention is to provide a technique for acquiring a PU name of a SNA session in a network without requiring a presence on or any constant communication with VTAM on a host mainframe of the network.

Another object of the present invention is to provide a technique that eliminates communication with VTAM through a VTAM exit process, yet still allows acquisition of PU names of SNA sessions in the network.

SUMMARY OF THE INVENTION

The present invention is directed to a technique for efficiently creating a database used to correlate information identifying data session traffic exchanged between entities of a computer network with information relating to multi-protocol intermediate devices configured to carry the session traffic throughout the network. The intermediate devices are preferably routers configured to carry System Network Architecture (SNA) session traffic between SNA entities comprising a host network connection ("host") and a physical unit (PU) station. The inventive technique allows a network management station (NMS) program to establish a NMS database by obtaining a PU name associated with an active SNA session without requiring a presence on or continual communication with a virtual telecommunication access method (VTAM) on the host.

Specifically, the technique allows the NMS to acquire the PU name of an SNA session through information gathered using a Simple Network Management Protocol (SNMP). An SNMP manager of the NMS "learns" about the SNA session by acquiring SNA session information from the routers via SNMP management information bases (MIBs). For example, source and destination media access control (MAC) and service access point (SAP) addresses of the SNA session may be acquired by Data Link Switching (DLSw) and Advanced Peer to Peer Networking (APPN) routers, whereas an identifier block number/identifier number (IDBLK/IDNUM) or a control point (CP) name of the PU initiating the SNA session may be acquired by a router configured to carry TN3270 session traffic.

In the illustrative embodiment, the computer network is preferably a DLSw network comprising multiple source-route-bridge (SRB) subnetworks interconnected DLSw routers over, e.g., a Transmission Control Protocol/Internet Protocol (TCP/IP) network cloud. A DLSw peer connection is established between a local DLSw router and its remote "peer" DLSw router over the TCP/IP cloud; each DLSw peer connection comprises DLSw circuits that are identified by, inter alia, data link IDs comprising attachment addresses of the host and PU entities. Notably, the host network connection of the DLSw network utilizes a channel-attached interface processor (CIP) router for connectivity with the host; the host may be further connected to the NMS via a TCP/IP pipe connection.

According to the invention, a process (CSNA) on the CIP router acquires information from SNA session traffic flowing through the router, which information is used to establish the NMS database. For example, an activate PU (ActPU) session frame flows through the CIP router and includes the IDBLK/IDNUM or CP name of the PU initiating the SNA session. The CSNA process extracts the IDBLK/IDNUM or CP name from the ActPU frame and associates it with the MAC/SAP addresses of the session. The CSNA process then provides the extracted SNA session information to an SNMP agent for population into the SNMP MIB. Thereafter, the router may be queried by the NMS using SNMP to provide either all or a portion of the SNA session information contained in the MIB.

An SNMP manager on the NMS requires temporary access to configuration information stored on VTAM. The VTAM configuration information can be downloaded from the host to the NMS as needed either over the pipe connection or via a file transfer program. This information is then loaded onto the NMS database to allow the SNMP manager to quickly retrieve a PU name for an SNA session in response to a specified IDBLK/IDNUM or CP name. If only the source and destination MAC/SAP addresses of the session are known, the IDBLK/IDNUM and/or CP name can be acquired from the CIP router to enable look-up of the PU name.

As described herein, the inventive technique may be implemented as an SNMP/SNA correlator engine process. Upon initiating the correlator engine, any new VTAM files are downloaded and incorporated into the NMS database. The correlator then issues an SNMP query to each CIP router for a list of currently active SNA sessions along with information relating to those sessions. Once the SNA session information is obtained, the engine correlates that information with the VTAM information downloaded from the host to determine a PU name associated with a particular IDBLK/IDNUM or CP name associated with a MAC/SAP address. That is, the PU name (retrieved from VTAM) associated with a particular IDBLK/IDNUM (retrieved from the CIP router) can be determined by correlating the CIP-provided information with the VTAM-provided information to determine either the PU name associated with a MAC/SAP address or the MAC/SAP address associated with a PU name. Thus, the inventive technique eliminates the need to query VTAM repeatedly in order to correlate the information.

In accordance with an aspect of the invention, a workstation exit procedure may be used to generate a PU name instead of obtaining and storing the name in the NMS database. That is, workstation exit code is invoked to calculate a PU name if the name is typically generated by a VTAM exit procedure when the PU connects to the network. In this case, the workstation exit routine uses the same algorithm as employed on the host to determine the VTAM PU name. The input to the exit is the same as that for the database lookup, i.e., the IDBLK/IDNUM or CP name.

Advantageously, the inventive technique enables the NMS to obtain PU names without requiring continual presence and interfacing with the host VTAM through a complex exit routine. Broadly stated, the invention may eliminate the need for SNA view application and VTAM exit code requirements for DLSw correlation. Yet if there is a desire to maintain a "mainframe presence" to access SNA session information from VTAM, the SNA View applications may be installed on the host and NMS to enable communication over the pipe connection. In this latter case, only the VTAM exit code is eliminated from the host. The inventive technique is particularly useful for organizations that are responsible for managing a TCP/IP-based SNA network, but are not able to place an application on the host mainframe. The present invention allows these organizations to acquire the VTAM PU names for SNA sessions so that they can communicate with their customers about session problems.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 3:
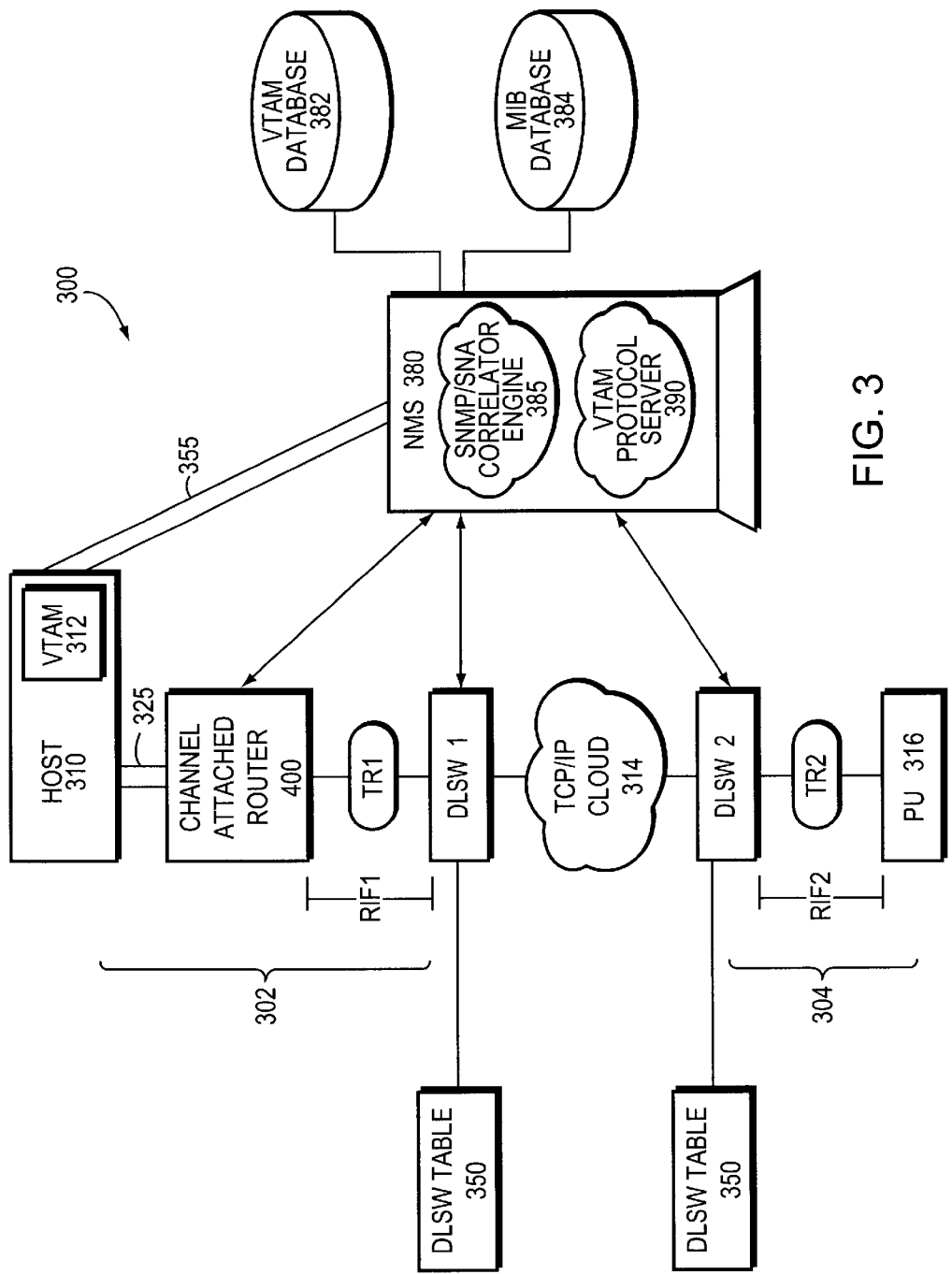
FIG. 3 is a highly schematic block diagram of a computer network including a host mainframe computer and a channel-attached router for mainframe connectivity with the host computer.

FIG. 3 is a highly schematic block diagram of a network 300 comprising a plurality of subnetworks 302–304 interconnected by a wide area network (WAN) 314. Each subnetwork 302–304 is preferably of a type that supports source-route bridging (SRB) operations with respect to the contents of a routing information field (RIF) of a frame.

The subnetworks are attached to a plurality of stations preferably embodied as internet-working computer platforms and comprising a host computer 310, a physical unit (PU) 316, a network management station (NMS) 380 and a plurality of intermediate stations. The host computer 310 is preferably a Systems Network Architecture (SNA) host mainframe entity coupled to a channel-attached router. In particular, the host network connection is coupled to a token ring (TR) local area network (LAN) TR1 to form subnetwork 302 and the PU 316 is coupled to TR2 to form subnetwork 304.

Each station typically comprises a plurality of interconnected elements, such as a processor, a memory and an input/output (I/O) unit. The memory may comprise storage locations addressable by the processor and I/O unit for storing software programs and data structures associated with the inventive database creation technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the technique described herein.

The I/O unit, in turn, connects the station to mass storage devices, such as disks, and to the subnetworks. The NMS may further include a conventional display monitor with a display screen and cursor control devices, such as a keyboard, connected to I/O unit. A window environment, such as a graphical user interface (GUI), is preferably displayed on the screen as a graphical display to facilitate interactions between a network operator and the station. For the NMS and intermediate stations, the disk may function as a database for storing network information, as described further herein. Typically, the I/O unit receives information, such as control, address and data signals, from the keyboard or the database, and provides that information to the processor for display on the screen or for transfer over the subnetworks.

Figure 4:
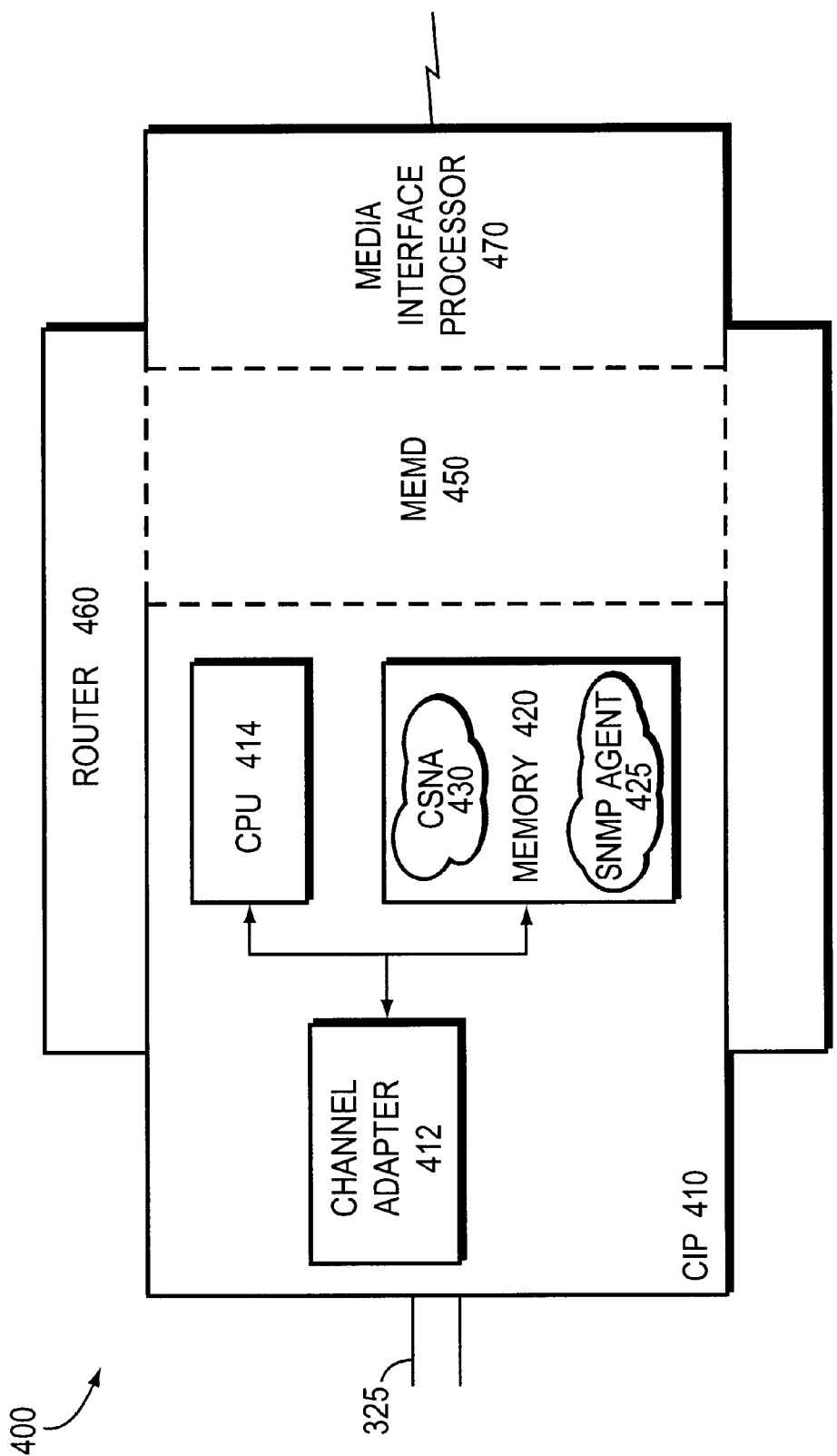
FIG. 4 is a block diagram of the channel-attached router that may be advantageously used with the present invention.

In the illustrative embodiment, the host network connection preferably utilizes a channel-attached router (as opposed to a FEP) for mainframe connectivity with the host computer. FIG. 4 is a block diagram of an illustrative embodiment of a channel-attached router 400 comprising a channel interface processor (CIP) 410, a memory switching fabric (MEMD) 450, a route processor (router) 460 and a media interface processor 470. The media interface processor 470 provides an outbound interface connection to a plurality of different wide area and local area network media (e.g., token ring, FDDI and Ethernet) to enable transfer of data packets over those media. The router 460 is configured to facilitate the flow of the data packets throughout the network by routing them to proper destination nodes.

The CIP 410 provides high-performance, multiprotocol network access to the host computer 310 and, to that end, includes a channel adapter 412 that directly couples to a channel 325 between the host and CIP. A central processing unit (CPU) 414 and memory 420 of the CIP cooperate with the channel 325 to relieve the host 310 from tasks associated with direct communication with destination nodes, thereby saving host resources while allowing concurrent data and I/O processing. Control and application programs stored in the memory 420 communicate with respective programs in the host via the exchange of data frames such as, e.g., SNA frames, in accordance with a predefined protoCol.

In the illustrative embodiment, the CIP 410 is embodied as module/card inserted is into the router 400. There may be multiple CIP cards 410 contained in a single router 400 wherein each card couples to the host mainframe. As described herein, Simple Network Management Protocol (SNMP) queries issued by the NMS are directed to CIP 410 and correlation is performed on a CIP basis. More specifically, the queries are directed to a process (e.g., CSNA 430) executing on the CIP and configured to handle all SNA traffic flowing through the router 400 and over the channel connection to the host mainframe.

An example of CIP router that supports the CSNA process is described in Cisco Channel Interface Processor at <http://www.cisco.com/warp/public/558/61.html> (September 1995). The CSNA process 430 monitors the SNA traffic to acquire certain information relating to the SNA traffic sessions and, in cooperation with an SNMP agent executing on the router, provides that information to the NMS. The SNA sessions processed by the router 400 may traverse intermediates stations employing any type of protocol "downstream" of the host network connection; in the illustrative embodiment, data link switching (DLSW) is the preferred protocol employed downstream of the host network connection and, accordingly, the intermediate stations are DLSw routers 1, 2.

The DLSw 1,2 cooperate to interconnect the subnetworks and facilitate communication among the host and PU stations over the WAN, which is preferably a Transmission Control Protocol/Internet Protocol (TCP/IP) network cloud 314. Communication among the stations is effected by exchanging discrete packets or frames of data according to predefined protocols and services; an example of a connection-oriented service that may be used to ensure reliable communication between the PU station and the host station is an IEEE 802.2 Logical Link Control Type 2 (LLC2) connection service. The DLSw routers facilitate such communication by establishing peer relationships among themselves through the exchange of conventional capabilities exchange messages. These peer devices further cooperate to establish a conventional reliable transport connection, such as a TCP connection, that enables multiplexing of LLC2 data frames over the TCP transport between the devices.

As a result, the DLSw devices function as peers having logical and physical connections among them for interconnecting the subnetworks 302–304 through the IP cloud to form the DLSw network 300. Each logical connection is manifested as a DLSw circuit having a data link identifier (ID) comprising media access control (MAC) and service access point (SAP) attachment addresses of the host and PU entities. For example, a DLSw circuit extends between DLSw1 and DLSw2, wherein DLSw1 is configured as a host router coupled to TR1 and having a peer relationship with a remote router DLSw2 over IP cloud 314. The generation of DLSw circuits and identifiers is described in *Request for Comment* (RFC) 1795 by Wells & Bartky, 1995, while the establishment of TCP sessions is described in *Internetworking with TCP/IP* by Comer and Stevens, printed by Prentice Hall, 1991; all of these publications are hereby incorporated by reference as though fully set forth herein.

The RIF contains source route information in the form of ring number/bridge number tuples within a path between the stations. There is a RIF1 associated with subnetwork 302, and a RIF2 associated with subnetwork 304. The RIF information terminates inside a virtual ring of each router and is locally stored at the router, preferably on a DLSw table 350. Thus, RIF1 is "cached" at DLSw1 and RIF2 is cached at DLSw2. In addition, each DLSw table 350 contains data link and circuit IDs of the DLSw circuit associated with the respective DLSw router.

The DLSw network environment is managed by the NMS 380 which, in the illustrative embodiment, is preferably a UNIX workstation configured to execute a network management application. An example of such an application is the CiscoWorks Blue Maps and CiscoWorks Blue SNA View product set, available from Cisco Systems, Inc. The CiscoWorks Blue product set provides a network operator with tools to draw a path of data transferred through the network. That is, the product set provides a view of an SNA data session extending from the PU to the host network connection. Using the product set, the operator may diagnosis problems by understanding the data path through the network, and isolating the problem to one of the segments in the network. The present invention is an extension to the CiscoWorks Blue Maps used in accordance with a conventional approach for correlating SNA/IP information in a network, with the added benefit of enabling retrieval and correlation of a PU name without requiring a presence on or continual communication with a virtual telecommunication access method (VTAM) on the host mainframe of the network.

The CiscoWorks Blue SNA View tool has a mainframe component and a UNIX workstation component that allows the NMS to retrieve SNA-specific information about the host and PU entities. The NMS 380 may communicate with the host station over a TCP/IP (or LU 6.2) "pipe" connection 355 to acquire information available from a VTAM table 312 at the host. The VTAM information includes (i) a PU name and (ii) an identifier block number/identifier number (IDBLK/IDNUM) or control point (CP) name associated with the PU name. VTAM identifies each PU session in the network by a CP name or IDBLK/IDNUM, the latter of which may be statically defined at the host and PU or dynamically generated by a VTAM exit procedure when the PU connects to the network. According to the invention, this VTAM information can be downloaded as needed either over the pipe or via a file transfer protocol and stored on a VTAM database 382 at the NMS.

The NMS 380 also communicates with the CIP router using SNMP to acquire NA session information. Here, the CiscoWorks Blue SNA View tool queries SNMP gents in the routers to acquire the information used to determine the PU sessions connected with the host. The SNA session information provided by each CIP router includes (i) the local and remote MAC/SAP addresses associated with the PU session flow, (ii) the IDBLK/IDNUM or CP name of the PU and (iii) the contents of a RIF field from each SNA session frame.

The NMS acquires the SNA session information from the CIP router 400 via Cisco SNMP management information base (MIB) structures for storage on a MIB database 384 of the NMS 380. An example of a SNMP MIB that may be advantageously used with the present invention is described at http://www.cisco.com/public/mibs/v2/CISCO-SNA-LLC-MIB.my, which is hereby incorporated by reference in its entirety. It should be noted that network management techniques other than SNMP, such as "sniffers" or show commands in the routers, may be used to acquire the circuit information from the routers.

In accordance with the present invention, a technique is provided for efficiently creating a database used to correlate information identifying SNA session traffic exchanged between PU and host entities of a computer network with information relating to multi-protocol intermediate devices configured to carry the session traffic throughout the network. Specifically, the inventive technique allows the NMS to obtain a PU name associated with an active SNA session without requiring a presence on or continual communication with VTAM on the host. More particularly, the technique allows the NMS to acquire the PU name through information gathered using SNMP.

Broadly stated, the CSNA process of CIP 410 acquires certain information relating to SNA sessions flowing through the router. An example of an SNA session flow monitored by the router is an activate PU (ActPU) flow that is issued by the PU when it connects to the network. The ActPU flow includes the IDBLK/IDNUM or CP name of the PU initiating the SNA session. The ActPU flow is well known and described in <http://www.cisco.dk/warp/public/100/44.html> titled, SNA Networking. Upon receiving the ActPU flow, the host compares the IDBLK/IDNUM or CP name with the VTAM information to identify the appropriate PU session. As the session frame traffic flows through the router, the CSNA process extracts the information associated with the session and provides that SNA session information to the SNMP agent which populates the SNMP MIB.

Thereafter, the router 400 can be queried by the NMS using SNMP to provide either all or a portion of the SNA session information contained in the MIB. Although the CIP router cannot provide a PU name associated with the session, it is able to provide other pertinent information relating to each active SNA session. Once the SNA session information is obtained by the NMS, it is correlated with the VTAM information downloaded from the host. That is, the PU name (retrieved from VTAM) associated with a particular IDBLK/IDNUM or CP name (retrieved from the CIP 410) can be determined by correlating the CIP-provided information with the VTAM-provided information. The MAC/SAP addresses associated with the PU name can then be determined using the correlation process.

Figure 1:
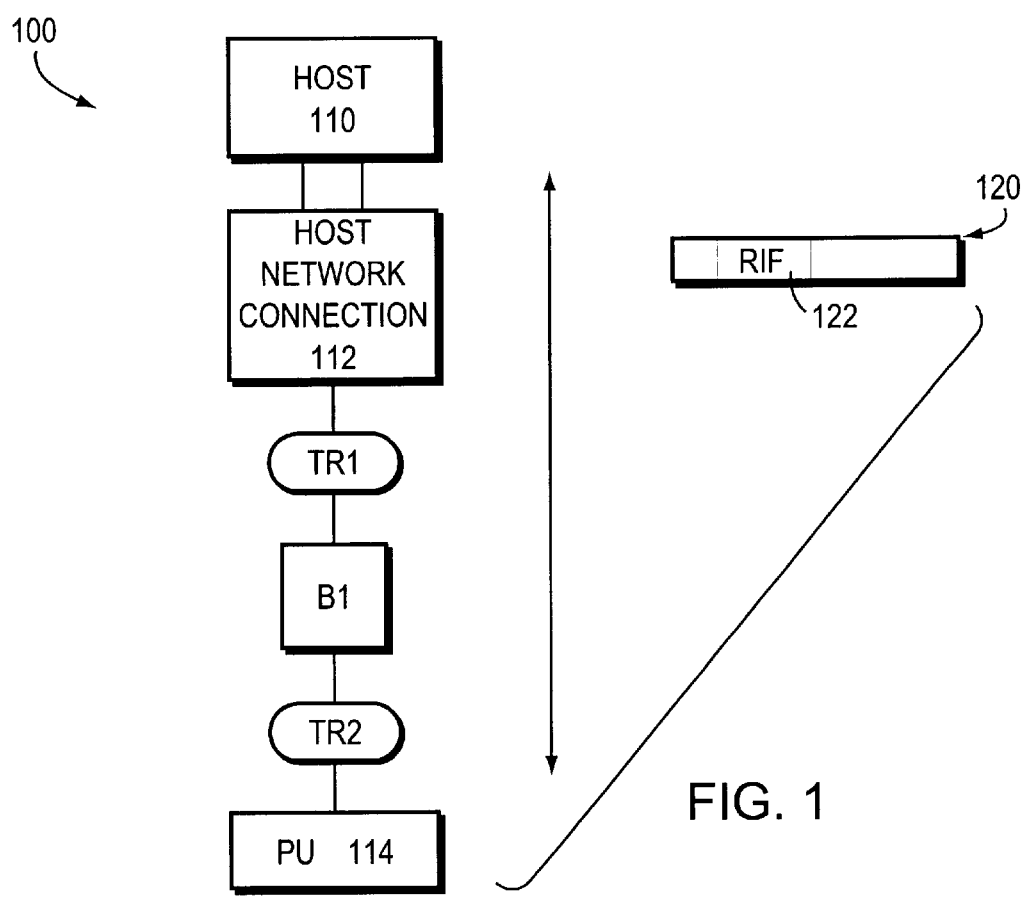
FIG. 1 is a schematic block diagram of a conventional computer network having a host computer and end station coupled to a plurality of token ring local area networks to form a source-route bridge (SRB) network.
Figure 2:
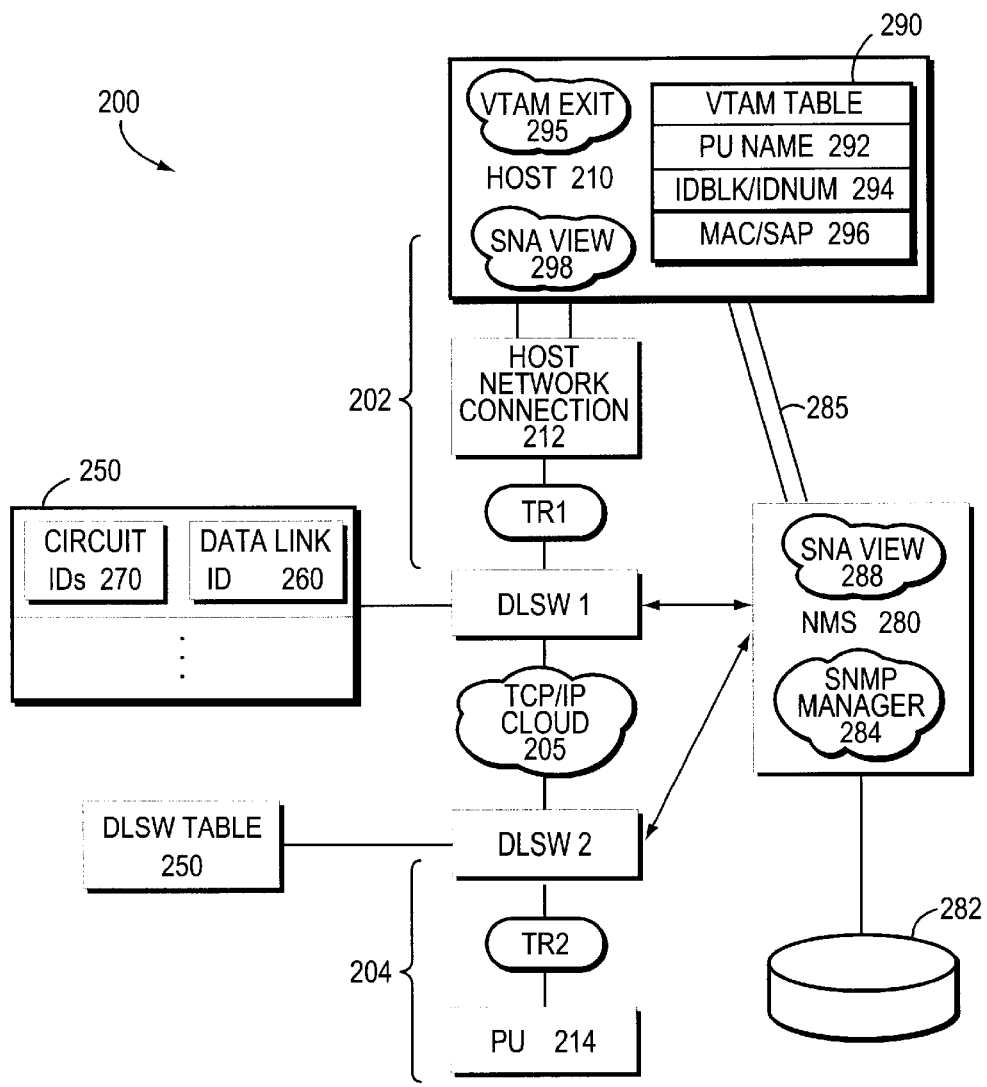
FIG. 2 is a schematic block diagram of a data link switching (DLSw) network having a wide area network (WAN) cloud disposed between host and remote SRB subnetworks.

In the illustrative embodiment, the inventive technique is implemented as an SNMP/SNA correlator engine process 385. Upon initiating the correlator engine 385, any new VTAM files are downloaded and incorporated onto the VTAM database 382. The correlator then issues an SNMP query to each CIP router for a list of currently active SNA sessions along with pertinent information relating to those sessions. At each CIP router, the CSNA process scans the ActPU flow of an active session, extracts the pertinent information from the flow and stores it in an SNMP MIB. It should be noted that the "life" of the SNA session information collected by the CIP and used for correlation is that of the "life" of the active session; i.e., once the PU session becomes inactive, the SNA session information provided in the SNMP MIB becomes stale. An SNMP agent 425 residing on the CIP router communicates with an SNMP manager process (see FIG. 2 at 284) on the NMS to retrieve the information and store it on the database 384.

Figure 5:
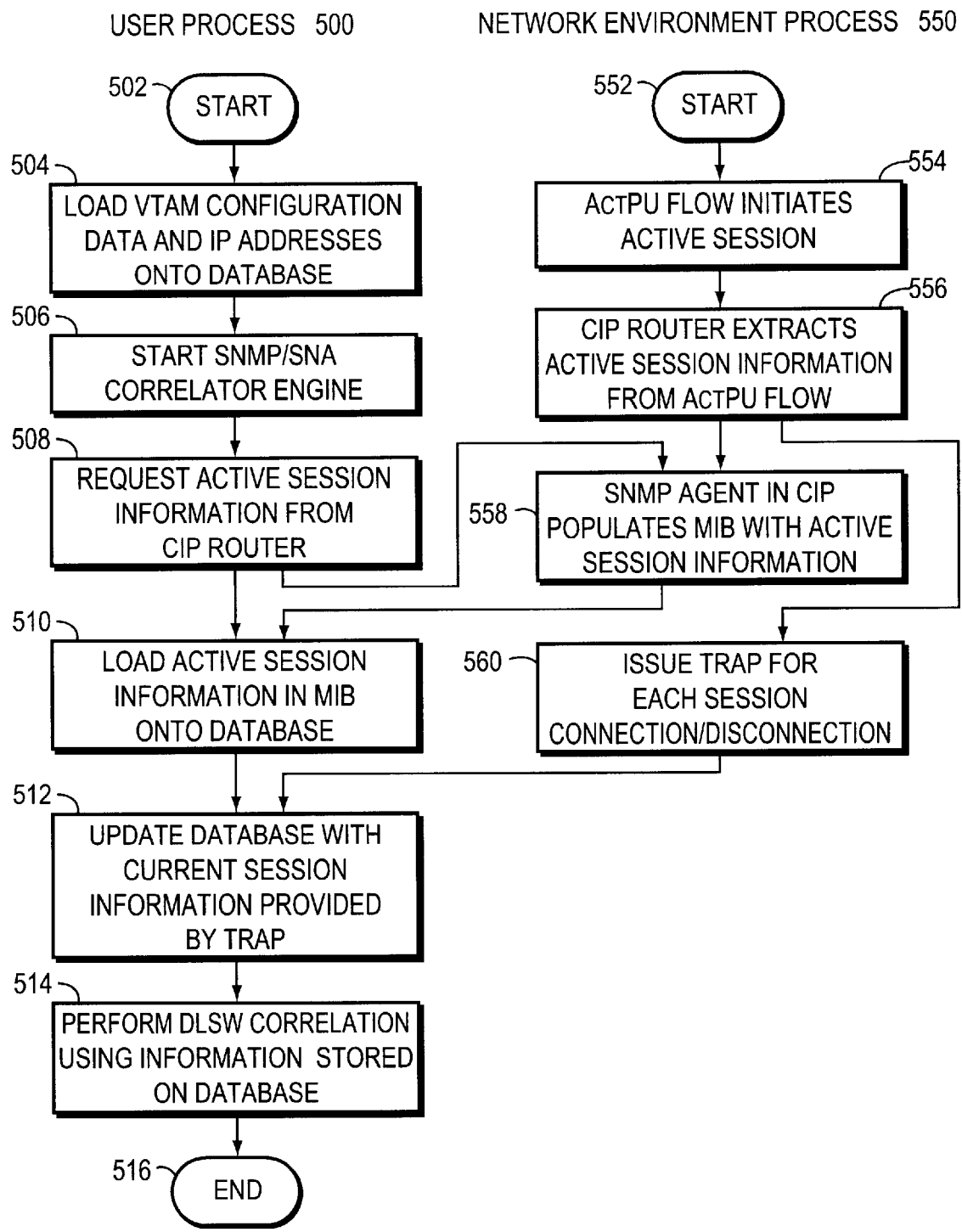
FIG. 5 is a flowchart illustrating the steps involved in a novel database creation technique in accordance with the present invention.

FIG. 5 is a flowchart illustrating the sequence of steps involved in the novel database creation technique comprising a user process 500 and a network environment process 550 that operate in parallel and cooperate to determine a VTAM PU name through information gathered by SNMP. The user sequence begins at Step 502 and proceeds to Step 504 where VTAM configuration data, along with a list of IP addresses of the CIP routers in the network, are loaded onto the NMS databases. As noted, the VTAM configuration data includes the PU name and its associated IDBLK/IDNUM or CP name; this information can either be downloaded (as needed) over the TCP/IP pipe coupling the NMS to the host or it can be loaded (as needed) via local load media. The SNMP/SNA correlator engine is started in Step 506 and, in Step 508, the correlator requests all active session information from the CIP router via an SNMP query for an SNMP MIB.

The network environment sequence begins at Step 552 and proceeds to Step 554 where a PU issues an ActPU flow to initiate a PU session connection through the CIP router to the host. In Step 556, the CSNA process scans the active PU session flow, extracts the pertinent SNA session information and locally stores the extracted information. As noted, the extracted SNA session information includes (i) the local and remote MAC/SAP addresses of the session, (ii) the RIF and (iii) the IDBLK/IDNUM or CP name pertaining to the session. In Step 558, the SNMP agent in the router populates the appropriate SNMP MIB with the active session information for use by the NMS and provides the MIB to the NMS in response to the SNMP query.

In Step 560, the CIP router generates a trap (SNMP notification) message for each SNA session connection/disconnection and forwards the message to the NMS. The trap message informs the NMS that the router has current session data; the active session data is also included in the message. When the NMS is initially "brought-up", the correlator engine requests a list of active PU sessions and corresponding active session data from each CIP router. Thereafter as the SNA sessions connect/disconnect, the CIP router informs the correlator engine of the status of these sessions via traps, thereby obviating prompting (polling) by the engine. The traps thus provide a means for ensuring that the NMS correlator engine has updated and coherent session information.

Referring again to the user sequence, the correlator engine 385 loads the active session information contained in the MIB onto the database (Step 510) and, in Step 512, updates the NMS database with current SNA session information provided by the traps. The SNMP/SNA correlator engine thus has all the necessary information it needs to initiate correlation. That is, the inventive technique has resulted in the acquisition of the active SNA session information required to perform correlation, which information would otherwise have been acquired through VTAM queries.

Specifically, a VTAM protocol server 390 executing on the NMS obtains the PU name from the VTAM configuration data loaded on the database without having to query the VTAM in the host. Correlation may be performed among various protocols used in the network; in the illustrative embodiment described herein, the protocol is DLSw and correlation is based on the MAC/SAP address. At Step 514, correlation is performed between the DLSw routers and PU/host entities; an example of a technique for efficiently correlating information that may be advantageously used with the present invention is described in copending and commonly-assigned patent application titled Method and Apparatus for SNA/IP Correlation in a Mixed APPN and DLSw Network, by Darin Ferguson et al, which application is hereby incorporated by reference as though fully set forth herein. Broadly stated, the correlation technique involves identifying a DLSw circuit by matching the appropriate local and remote MAC/SAP addresses within the database and then acquiring IDBLK/IDNUM or CP name to associate the appropriate PU name and thus identify the PU session. The sequence ends in step 516.

In summary, the inventive technique is used to populate/establish an NMS database without continually issuing VTAM inquires. The status of a PU can be inferred from the information collected for the active session by analyzing whether the session has connected/disconnected; that is, if the session has connected and there has been no disconnect, then the PU session is active and the PU is active. The PU type can also be inferred from the VTAM configuration information initially loaded into NMS database. Thus, virtually all of the information that could be gathered using the prior methods when querying VTAM can also be obtained using the inventive technique.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently creating a network management station (NMS) database used to correlate information identifying an active data session between a host computer and a physical unit (PU) of a computer network with information relating to multi-protocol intermediate devices configured to carry the session data throughout the network, the host computer including a virtual telecommunication access method (VTAM) for storing a PU name associated with the active session, the method comprising the steps of:

providing a channel-attached router for connectivity with the host computer;

loading VTAM configuration information onto the NMS database, the VTAM configuration information including a name of the PU (PU name) and its associated identifier block number/identifier number (IDBLK/IDNUM) or control point (CP) name;

extracting information at the channel-attached router relating to the active data session flowing through the router, the extracted information including local and remote media access control (MAC) and service access point (SAP) addresses associated with the session, along with the IDBLK/IDNUM or CP name of the PU; and loading the extracted information onto the NMS database to thereby enable correlation without requiring a presence on or continual communication with VTAM.

2. The method of claim 1 further comprising the step of initiating the data session with an activate PU (ActPU) session frame issued by the PU through the channel-attached router to the host computer, the ActPU session frame including the IDBLK/IDNUM or CP name of the PU.

3. The method of claim 2 wherein the step of extracting comprises the steps of:

providing an extraction process executing on the channel-attached router;

acquiring the IDBLK/IDNUM or CP name of the PU from the ActPU session frame; and associating the IDBLK/IDNUM or CP name with the MAC/SAP addresses of the session.

4. The method of claim 3 wherein the step of loading the extracted information comprises the steps of:

providing the extracted information to an agent of the router; and populating a management information base (MIB) with the extracted information.

5. The method of claim 4 wherein the agent is a simple network management protocol (SNMP) agent and wherein the MIB is a SNMP MIB.

6. The method of claim 5 wherein the step of loading the extracted information further comprises the step of querying the router to provide the SNMP MIB to the NMS.

7. The method of claim 6 wherein the step of loading the VTAM information comprises the step of downloading the VTAM information from the host computer to the NMS as needed over a pipe connection or via a file transfer protocol.

8. The method of claim 7 further comprising the steps of, wherein the data session is a Systems Network Architecture (SNA) data session:

initiating a SNMP/SNA correlator engine prior to the step of downloading the VTAM information;

issuing an SNMP query to the channel-attached router for a list of currently active SNA data sessions along with information relating to those sessions; and in response to obtaining the SNA session information, correlating the SNA session information with the VTAM information downloaded from the host computer; and determining a PU name associated with the IDBLK/IDNUM or CP name.

9. The method of claim 8 further comprising the step of generating a PU name with a workstation exit procedure instead of downloading the PU name from the host computer.

10. The method of claim 9 wherein the step of generating comprises the steps of:

invoking the workstation exit procedure at the NMS;

calculating the PU name in accordance with the workstation exit procedure.

11. Apparatus for efficiently creating a network management station (NMS) database used to correlate information identifying an active Systems Network Architecture data session between a host computer and a physical unit (PU) of a computer network with information relating to multi-protocol intermediate devices configured to carry the SNA session data throughout the network, the host computer including a virtual telecommunication access method (VTAM) for storing a PU name associated with the active SNA session, the apparatus comprising:

a channel-attached router connected to the host computer;

means for loading VTAM configuration information onto the NMS database, the VTAM configuration information including a name of the PU (PU name) and its associated identifier block number/identifier number (IDBLK/IDNUM) or control point (CP) name;

an extraction process executing on the channel-attached router and adapted to extract information relating to the active data session flowing through the router, the extracted information including local and remote media access control (MAC) and service access point (SAP) addresses associated with the session, along with the IDBLK/IDNUM or CP name of the PU; and a correlator engine executing on the NMS and adapted to load the extracted information onto the NMS database to thereby enable correlation without requiring a presence on or continual communication with VTAM.

12. The apparatus of claim 11 wherein the means for loading comprises a pipe connection or a file transfer program.

13. The apparatus of claim 12 further comprising a management information base (MIB) adapted to store the information extracted at the channel-attached router.

14. The apparatus of claim 13 wherein the channel-attached router is a channel interface processor (CIP) router and wherein the extraction process is a CSNA process executing on the CIP router.

15. A computer readable medium containing executable program instructions for efficiently creating a network management station (NMS) database used to correlate information identifying an active data session between a host computer and a physical unit (PU) of a computer network with information relating to multi-protocol intermediate devices configured to carry the session data throughout the network, the host computer including a virtual telecommunication access method (VTAM) for storing a PU name associated with the active session, the executable program instructions comprising program instructions for:

providing a channel-attached router for connectivity with the host computer;

loading VTAM configuration information onto the NMS database, the VTAM configuration information including a name of the PU (PU name) and its associated identifier block number/identifier number (IDBLK/IDNUM) or control point (CP) name;

extracting information at the channel-attached router relating to the active data session flowing through the router, the extracted information including local and remote media access control (MAC) and service access point (SAP) addresses associated with the session, along with the IDBLK/IDNUM or CP name of the PU; and loading the extracted information onto the NMS database to thereby enable correlation without requiring a presence on or continual communication with VTAM.

16. The computer readable medium of claim 15 further comprising program instructions for initiating the data session with an activate PU (ActPU) session frame issued by the PU through the channel-attached router to the host computer, the ActPU session frame including the IDBLK/IDNUM or CP name of the PU.

17. The computer readable medium of claim 16 wherein the program instructions for extracting comprises program instructions for:

providing an extraction process executing on the channel-attached router;

acquiring the IDBLK/IDNUM or CP name of the PU from the ActPU session frame; and associating the IDBLK/IDNUM or CP name with the MAC/SAP addresses of the session.

18. The computer readable medium of claim 17 wherein the program instructions for loading the extracted information comprises program instructions for:

providing the extracted information to an agent of the router; and populating a management information base (MIB) with the extracted information.

19. The computer readable medium of claim 18 wherein the agent is a simple network management protocol (SNMP) agent and wherein the MIB is a SNMP MIB.

20. The computer readable medium of claim 19 wherein the program instructions for loading the extracted information further comprises program instructions for querying the router to provide the SNMP MIB to the NMS.

21. Apparatus for efficiently creating a network management station (NMS) database used to correlate information identifying an active Systems Network Architecture data session between a host computer and a physical unit (PU) of a computer network with information relating to multi-protocol intermediate devices configured to carry the SNA session data throughout the network, the host computer including a virtual telecommunication access method (VTAM) for storing a PU name associated with the active SNA session, the apparatus comprising:

s a channel-attached router connected to the host computer;

physical and logical connections for loading VTAM configuration information onto the NMS database, the VTAM configuration information including a name of the PU (PU name) and its associated identifier block number/identifier number (IDBLK/IDNUM) or control point (CP) name;

an extraction process executing on the channel-attached router and adapted to extract information relating to the active data session flowing through the router, the extracted information including local and remote media access control (MAC) and service access point (SAP) addresses associated with the session, along with the IDBLK/IDNUM or CP name of the PU; and a correlator engine executing on the NMS and adapted to load the extracted information onto the NMS database to thereby enable correlation without requiring a presence on or continual communication with VTAM.

22. The apparatus of claim 21 wherein the logical connection comprises a pipe connection or a file transfer program.

23. The apparatus of claim 22 further comprising a management information base (MIB) adapted to store the information extracted at the channel-attached router.

24. The apparatus of claim 23 wherein the channel-attached router is a channel interface processor (CIP) router and wherein the extraction process is a CSNA process executing on the CIP router.

25. A method for heterogeneous network management comprising accessing PU mapping information from a remote database for storing in a local database, the accessing occurring at the occurrence of predetermined events;

collecting SNA session information through monitoring network traffic;

correlating SNA session information with PU mapping information to obtain PU name.

26. A node for carrying out the method according to claim 1.

27. A communication network comprising at least one node according to claim 11.

28. A computer-readable medium comprising: instructions and data written thereon, said instructions and data containing information having instructions for execution in a processor for the practice of the method of claim 1, or claim 25.

29. Electromagnetic signals travelling over a computer network comprising: said electromagnetic signals carrying information having instructions for execution in a processor for the practice of the method of claim 1, or claim 25.

30. A method for operating a network management station (NMS) database, the method comprising the steps of:
   loading virtual telecommunication access method (VTAM) configuration information relating to the identification of a physical unit (PU) of a computer network onto the NMS database;
   extracting information from a channel-attached router relating to addresses of an active data session and to the identification of a PU; and
   loading the extracted information onto the NMS database to thereby enable correlation without requiring a presence on or continual communication with VTAM.

31. An apparatus for creating a network management station (NMS) database of active data sessions between a host computer and a physical unit (PU) of a computer network, the apparatus comprising:
   a channel-attached router;
   physical and logical connections for loading virtual telecommunication access method (VTAM) configuration information relating to the identification of the PU onto the NMS database;
   a means for extracting information at the channel-attached router relating to addresses of an active data session and to the identification of a PU; and
   a correlator engine executing on the NMS and adapted to load the extracted information onto the NMS database to thereby enable correlation without requiring a presence on or continual communication with VTAM.

32. The apparatus of claim 31 wherein the logical connection comprises a pipe connection or a file transfer program.

33. The apparatus of claim 32 further comprising a management information base (MIB) adapted to store the information extracted at the channel-attached router.

34. The apparatus of claim 33 wherein the channel-attached router is a channel interface processor (CIP) router and wherein the extraction process is a CSNA process executing on the CIP router.

35. An apparatus for creating a network management station (NMS) database of active data sessions between a host computer and a physical unit (PU) of a computer network, the apparatus comprising:
   a channel-attached router;
   physical and logical connections for loading virtual telecommunication access method (VTAM) configuration information relating to the identification of the PU onto the NMS database;
   an extraction process executing on the channel-attached router and adapted to extract information relating to addresses of an active data session and to the identification of a PU; and
   a means for loading the extracted information onto the NMS database to thereby enable correlation without requiring a presence on or continual communication with VTAM.

36. The apparatus of claim 35 wherein the logical connection comprises a pipe connection or a file transfer program.

37. The apparatus of claim 36 further comprising a management information base (MIB) adapted to store the information extracted at the channel-attached router.

38. The apparatus of claim 37 wherein the channel-attached router is a channel interface processor (CIP) router and wherein the extraction process is a CSNA process executing on the CIP router.

39. An apparatus for creating a network management station (NMS) database of active data sessions between a host computer and a physical unit (PU) of a computer network, the apparatus comprising:
   a channel-attached router;
   physical and logical connections for loading virtual telecommunication access method (VTAM) configuration information relating to the identification of the PU onto the NMS database;
   an extraction process executing on the channel-attached router and adapted to extract information relating to addresses of an active data session and to the identification of a PU; and
   a correlator engine executing on the NMS and adapted to load the extracted information onto the NMS database to thereby enable correlation without requiring a presence on or continual communication with VTAM.

40. The apparatus of claim 39 wherein the logical connection comprises a pipe connection or a file transfer program.

41. The apparatus of claim 40 further comprising a management information base (MIB) adapted to store the information extracted at the channel-attached router.

42. The apparatus of claim 41 wherein the channel-attached router is a channel interface processor (CIP) router and wherein the extraction process is a CSNA process executing on the CIP router.

* * * * *